United States Patent [19]

Clark

[11] 4,168,932
[45] Sep. 25, 1979

[54] MULTIPLE POSITION VEHICLE CARRYING TRAILER

[75] Inventor: Bobby D. Clark, Shoshoni, Wyo.

[73] Assignee: Nitram, Inc., Shoshone, Wyo.

[21] Appl. No.: 838,796

[22] Filed: Oct. 3, 1977

Related U.S. Application Data

[63] Continuation-in-part of Ser. No. 753,668, Dec. 23, 1976, Pat. No. 4,109,809.

[51] Int. Cl.² .............................................. B60P 1/28
[52] U.S. Cl. ................................. 414/483; 298/8 R; 298/38
[58] Field of Search ................... 214/501, 505, 506; 298/8 R, 38; 296/1 A

[56] References Cited

U.S. PATENT DOCUMENTS

| 2,452,681 | 11/1948 | Rehberger | 214/505 |
| 3,198,365 | 8/1965 | Moll | 214/505 |
| 3,701,563 | 10/1972 | Lasko et al. | 298/38 |

FOREIGN PATENT DOCUMENTS 971515  7/1975  Canada ........................................ 214/505

*Primary Examiner*—Robert G. Sheridan
*Attorney, Agent, or Firm*—Bernard L. Kleinke

[57] ABSTRACT

A trailer adapted to carrying a plurality of vehicles, such as snowmobiles, includes a plurality of wheels and a pair of vehicle supporting trailer beds normally disposed in a use position in side-by-side relationship on a frame. Each one of the trailer beds is pivotally mounted on the frame at the rear edge thereof forwardly of the mid-point of the bed to enable it to tilt individually and independently backwardly until its rear edge contacts the ground for loading and unloading purposes and to enable the loaded bed to tilt back to its horizontal use position under the weight of the vehicle supported by it. Bumper devices are disposed on the frame for cushioning the movement of the bed under the weight of the vehicle, and latching devices hold the beds releasably in their horizontal position. Camming devices engage the beds as they move into their use positions for moving the latches to their release position, and spring biasing devices enable the latching devices to return to their holding positions. An elongated locking device prevent the locking devices from moving out of engagement with the bed. Pin devices secure releasably the latching devices in engagement with the beds. A locking rod extends through aligned apertures in the bed to secure releasably said bed to one another. Elongated leaf springs extend in a direction parallel to the axis of rotation of the wheels for cushioning the beds.

7 Claims, 5 Drawing Figures

U.S. Patent  Sep. 25, 1979  4,168,932
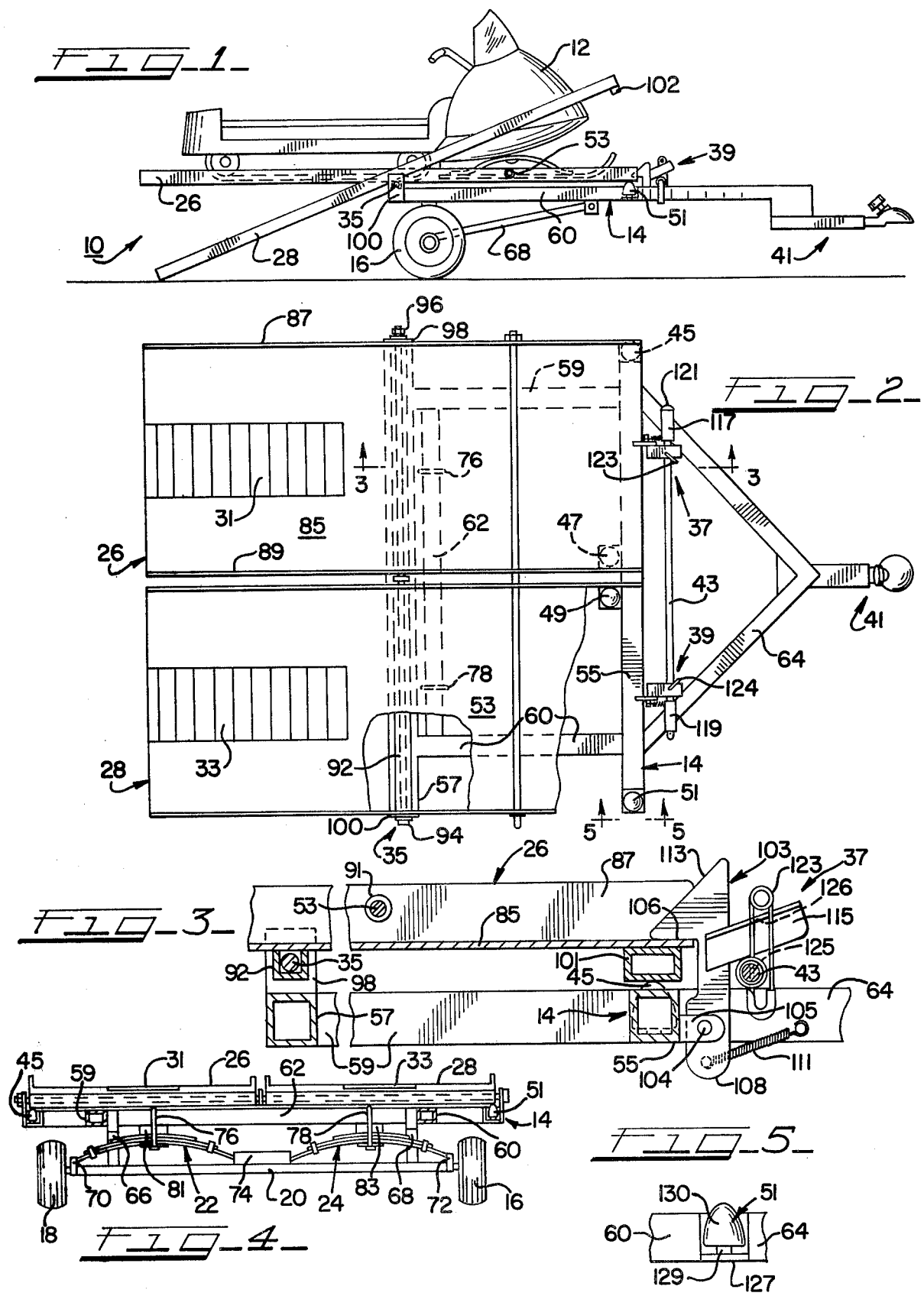

MULTIPLE POSITION VEHICLE CARRYING TRAILER

This patent application is a continuation-in-part application of U.S. patent application Ser. No. 753,668, filed on Dec. 23, 1976, now U.S. Pat. No. 4,109,809 issued Aug. 29, 1978.

The present invention relates in general to a multiple position vehicle carrying trailer, and more particularly relates to a trailer which is adapted to transport vehicles, such as snowmobiles.

There have been many different types and kinds of multiple position vehicle carrying trailers, such as snowmobile trailers. While the prior known snowmobile trailers have been satisfactory for many applications, it would be highly desirable to have such a snowmobile trailer which supports two snowmobiles on a pair of independently tiltable trailer beds which can be operated and controlled by a single person. In this regard, it would be highly desirable to have such a snowmobile trailer where a single person can drive the snowmobiles up onto the two beds which would then tilt automatically into their horizontal use positions and be latched in position automatically. Also, such a snowmobile trailer should be of the type where a single person can release the beds and tilt the heavily-loaded beds backwardly into their loading and unloading positions. Also, such trailers should have their loaded bed latched very securely and yet releasably against vibrations during use.

Therefore, the principal object of the present invention is to provide a new and improved multiple position vehicle carrying trailer, which may be useful in carrying snowmobile trailers and which may be loaded and unloaded by a single person.

Another object of the present invention is to provide such a new and improved multiple position vehicle carrying trailer, which has its beds latched very securely and yet releasably against vibrations.

Briefly, the above and further objects of the present invention are realized by providing a trailer having a plurality of wheels rotatably mounted on a frame, and a pair of vehicle supporting trailer beds normally disposed in a use position in a side-by-side relationship in a common horizontal plane. The beds are pivotally attached to the frame at the rear edge thereof forwardly of the mid-point of the beds to enable them individually and independently when either loaded or unloaded to tilt under the force of gravity backwardly until their rear edges contact the ground and to enable the loaded beds to tilt forwardly to their horizontal use position under the weight of the vehicle when the vehicles are driven up onto the tilted beds. Bumper devices disposed on the frame cushion the movement of the beds into their horizontal use position under the weight of the vehicles, and latching devices hold the beds releasably in their use position. Camming devices disposed on the latching devices engage the beds as they move into their use position to move the latching devices to their release positions. Biasing devices enable the latching devices to return to their holding positions in engagement with the beds when the latching devices are disposed in their latching positions to secure them against the bumper devices for firmly holding the beds in place so as to eliminate or at least greatly reduce vibrations during use. An elongated locking device is adapted to be positioned in engagement with the latching devices to prevent them from moving out of engagement with the beds. Pin devices are adapted to extend through aligned holes in the latching devices and the rod device to secure releasably the latching devices in engagement with the beds. A locking rod extends through aligned apertures in the beds to secure releasably the beds to one another so that if one of the latching devices should malfunction, the remaining latching device secures both of the beds in their horizontal use position. Elongated leaf spring devices connect the frame and the wheels together resiliently and extend in a direction parallel to the axis of rotation of the wheels for cushioning the beds.

Other objects, advantages and features of the present invention will become apparent to those skilled in the art from a review of the written description and the accompanying drawings wherein:

FIG. 1 is a side elevational view of a trailer, which is constructed in accordance with the present invention and which illustrates the trailer supporting one snowmobile, the trailer being in a position to load a second vehicle thereon;

FIG. 2 is a plan view of the trailer of FIG. 1, illustrating it in an unloaded position with the vehicle beds disposed in their horizontal position;

FIG. 3 is an enlarged cross-sectional elevational detail view of the trailer of FIG. 2 taken substantially along the line 3—3 thereof;

FIG. 4 is a rear elevational view of the trailer of FIG. 2 of the drawings; and

FIG. 5 is an enlarged detail view of one of the bumpers of FIG. 2 taken substantially along the line 5—5 thereof.

Referring now to the drawings, and more particularly to FIGS. 1 and 2 thereof, there is shown a trailer 10, which is constructed in accordance with the present invention, and as shown in FIG. 1 of the drawings, which is adapted to support a pair of snowmobiles, such as the snowmobile 12, in a side-by-side manner. The trailer 10 is adapted to carry two separate snowmobiles or other such vehicles simultaneously. The trailer shown in FIG. 1 of the drawings is in a position to load a second snowmobile (not shown) which is similar to the snowmobile 12. It is to be understood that the trailer 10 may also be used for carrying other types and kinds of vehicles, as well as snowmobiles, as will become apparent to those skilled in the art.

The trailer 10 generally comprises a frame 14 rollably supported above the ground by means of a pair of oppositely-disposed wheels 16 and 18 journaled for rotation on an axle (not shown) disposed rotatably within an axle sleeve 20 connected resiliently to the frame 14 by a pair of leaf springs 22 and 24, both of the leaf springs 22 and 24 being disposed between the axle sleeve 20 and the frame 14 and extending in a direction in parallel with and directly above the axle sleeve 20.

A pair of elongated trailer beds 26 and 28 are disposed normally in a side-by-side use position as shown in FIG. 2 of the drawings for supporting the snowmobile trailer from below. A pair of traction areas 31 and 33 positioned on the respective upper surfaces of the beds 26 and 28 facilitate the driving of the vehicles up onto the beds 26 and 28. The beds 26 and 28 are pivotally mounted at 35 to the frame 14 at the rear edge thereof. A pair of clamping devices 37 and 39 are pivotally mounted on the frame 14 and engage the front edges of the respective beds 26 and 28 to secure them releasably in their horizontal use position as best seen in FIGS. 2 and 3 of the drawings. A tongue 41 extends forwardly from the front portion of the frame 14 for adapting the trailer 10 to be connected releasably to another vehicle for pulling the trailer 10 in a conventional manner.

A locking pin or bar 43 maintains the clamp devices 37 and 39 in their latching positions during use as hereinafter described in greater detail. A series of four resilient bumpers 45, 47, 49 and 51 are mounted on the frame 14 to cushion the movement of the beds 26 and 28 as they pivot downwardly into their horizontal use positions under the weight of the snowmobiles when they are driven up onto the beds as hereinafter described in greater detail. Also, as hereinafter described in greater detail, the bumpers serve to press firmly the beds 26 and 28 against their respective clamping devices 37 and 39 to dampen vibrations during use.

A rod 53 extends transversely across both of the beds 26 and 28 to secure them together so that, should either one of the clamping devices 37 and 39 malfunction, the other one of the clamping devices is able to hold down both of the beds 26 and 28 to maintain them in their horizontal disposition.

Considering now in greater detail the frame 14, the frame 14 includes a pair of front and rear longer cross beams 55 and 57, which are rigidly connected to a pair of longitudinally extending beams 59 and 60 to form a rectangular frame. As best seen in FIG. 4 of the drawings, a shorter cross beam 62 is fixed rigidly at its opposite ends to the longitudinally extending beams 59 and 60 directly above and fixed to the leaf spring 22 and 24 as hereinafter described in greater detail. A v-shaped beam 64 interconnects rigidly the tongue 41 with the front cross beam 55.

As best seen in FIGS. 1 and 4 of the drawings, a pair of struts 66 and 68 are fixed between the axle sleeve 20 and the respective longitudinally extending beams 59 and 60 for support purposes.

Considering now the leaf springs 22 and 24 in greater detail with reference to FIG. 4 of the drawings, the leaf springs 22 and 24 are pivotally attached at their outer ends at 70 and 72, respectively, to the axle sleeve 20. The inner free ends of the respective leaf springs 22 and 24 are slidably mounted within opposite ends of a guide member 74 mounted on top of the axle sleeve 22.

A pair of U-bolts and nuts 76 and 78 fasten the intermediate upwardly bowed portions of the respective leaf springs 22 and 24 to the shorter intermediate cross beam 62. A pair of spacer blocks 81 and 83 are disposed between the respective leaf springs 22 and 24 and the beam 62. In this regard, the leaf springs 22 and 24 are mounted above the axle sleeve 22 and bow upwardly in a vertical plane directly below the intermediate shorter cross beam 62, so that the leaf springs support resiliently the frame 14 on the wheels 16 and 18 and the axle sleeve 20.

Considering now the beds 26 and 28 in greater detail with reference to the drawings, the beds 26 and 28 are similar to one another and therefore only the bed 26 will now be described in greater detail. The bed 26 includes a rectangularly shaped floor 85, and a pair of oppositely-disposed parallel upstanding longitudinally-extending side rails or flanges 87 and 89 having aligned holes, such as hole 91, for receiving the rod 53, the bed 28 having similar aligned holes (not shown) also for receiving the rod 53.

As best seen in FIG. 3 of the drawings, a pivot pin sleeve 92 is fixed to and extends transversely across the underside of the bed 85 surrounding concentrically the pivot pin at 35. The pivot pin at 35 has at one of its ends a head 94 and at its opposite end a washer and nut 96 to secure the pivot pin in place between a pair of apertured upstanding bracket plates 98 and 100 through which the pivot pin extends, the apertured bracket plates being fixed to the opposite ends of the rear longer cross beam 57. As a result, the beds 26 and 28 are pivotally attached to the rear longer cross beam 57.

As best seen in FIGS. 1 and 3 of the drawings, a pair of similar cross beams 101 and 102 are fixed to the undersides of the front edges of the respective beds 26 and 28 for the purpose of engaging the four bumpers, such as the bumper 45 as best seen in FIG. 3 of the drawings.

Considering now the clamping device 37 in greater detail with particular reference to FIG. 3 of the drawings, the clamping devices 37 and 39 are generally similar to one another, and therefore only the clamping device 37 will now be described in greater detail. The clamping device 37 includes a hooklike member 103 which is pivotally attached at 104 by means of a clevis 105 to the front cross beam 55 for engaging the upper surface of the floor 85. A backwardly extending hook edge 106 presses into engagement with the upper surface of the floor 85, and a bottom portion 108 of the member 103 below the pivot point 104 has a spring 111 stretched between it and the frame member 64 to bias the hook 106 into engagement with the upper surface of the floor 85.

An inclined camming surface 113 of the member 103 is adapted to be engaged by the beam 101 as the bed 26 falls downwardly into engagement with the 103 when a snowmobile is driven up onto the member bed 26 for loading purposes. A forwardly extending leg 115 is fixed to the hooklike member 103 and engages the locking pin or bar 43 so that the member 103 is prevented from rotating forwardly in a clockwise direction as viewed in FIG. 3 of the drawing. As a result, the latching device 37 remains in its vertical position as shown in FIG. 3 of the drawings.

In order to hold the locking bar 43 in position on the V-shaped beam 64, a pair of axially-aligned transversely-mounted sleeves 117 and 119 receive the locking bar 43. The bar has at one of its ends a head 121 and, for the purpose of securing the bar in position, a pair of safety pins 123 and 124 (FIG. 2) fix releasably the bar 43 to the forwardly extending legs, such as the leg 115 of the clamping device 37. In this regard, the bar has a pair of holes, such as the hole 125 (FIG. 3) for receiving one leg of the safety pin, and the forwardly extending legs, such as the leg 115 (FIG. 3), has holes, such as the hole 126 (FIG. 3), aligned with the respective holes in the forwardly extending legs for receiving the same leg of its safety pin.

Considering now the bumpers in greater detail with reference to FIG. 5 of the drawings, there is shown the bumper 51 which shall now be described in greater detail, it being understood that the other bumpers being similar to it. In order to support the bumper 51, an L-shaped bracket 127 is fixed to the end of the beam 55 for supporting the bumper 51. The bumper 51 includes an upstanding stem portion 129 fixed and supported by the L bracket 127, and a resilient bullet-shaped portion 130 mounted on the stem portion 149.

It will be readily apparent to those skilled in the art that the present invention provides a novel and useful improvement in multiple-position vehicle carrying trailers of the character described herein. The arrangement and types of structural components and materials utilized within the invention may be subject to numerous modifications well within the purview of this invention, and it is intended only to be limited to a liberal interpretation of the specification and appended claims.

What is claimed is:

1. A trailer adapted to carry a pair of first and second vehicles, comprising:
   frame means;
   a plurality of wheels rotatably mounted on said frame means to support it rollably above the ground;
   a pair of elongated vehicle supporting trailer beds having their weights distributed substantially uniformly throughout their lengths and normally disposed in a use position in side-by-side relationship in a common horizontal plane on said frame means for each supporting individually from below one of said vehicles;
   pivoting means disposed at the rear edge of said frame means for mounting individually and tiltably said beds on said frame means to enable them to tilt individually and independently until their rear edges contact the ground and to enable the loaded beds to tilt forwardly to their horizontal use position under the weight of the vehicles;
   latching means for holding said beds releasably in their use position;
   bumper means disposed on said frame means under said beds when they are disposed in their horizontal use position at the forward edges of said beds for cushioning the movement of the beds into their horizontal use position under the weight of the vehicles and for urging said beds resiliently against said latching means to retard vibrations;
   elongated locking means adapted to be positioned in engagement with the latching means to prevent said latching means from moving out of engagement with said beds; and
   wherein said beds include upstanding side marginal flanges and means defining apertures therein, further including a locking rod extending through said aligned apertures to secure releasably said beds to one another.

2. A trailer according to claim 1, further including elongated leaf spring means connecting said frame means and said wheel means and extending in a direction parallel to the axis of rotation of said wheel means for cushioning said beds.

3. A trailer according to claim 1, wherein said pivoting means mounts said beds forwardly of their midpoints to enable them when unweighted to tilt under the force of gravity backwardly.

4. A trailer adapted to carry a pair of first and second vehicles, comprising:
   frame means;
   a plurality of wheels rotatably mounted on said frame means to support it rollably above the ground;
   a pair of elongated vehicle supporting trailer beds having their weights distributed substantially uniformly throughout their lengths and normally disposed in a use position in side-by-side relationship in a common horizontal plane on said frame means for each supporting individually from below one of said vehicles;
   pivoting means disposed at the rear edge of said frame means for mounting individually and tiltably said beds on said frame means to enable them to tilt individually and independently until their rear edges contact the ground and to enable the loaded beds to tilt forwardly to their horizontal use position under the weight of the vehicles;
   latching means for holding said beds releasably in their use position;
   bumper means disposed on said frame means under said beds when they are disposed in their horizontal use position at the forward edges of said beds for cushioning the movement of the beds into their horizontal use position under the weight of the vehicles and for urging said beds resiliently against said latching means to retard vibrations;
   said pivoting means including sleeve means extending transversely under both of said beds and being fixed to one of said frame means and said beds, a pivot pin disposed axially within said sleeve means and fixed to the other one of said frame means and said sleeve means, and fastening means removably attached to said pivot pin;
   camming means disposed on said latching means for engaging said beds as they move into their use position to move said latching means to their released positions; and biasing means for enabling said latching means to return to their holding positions in engagement with said beds when said latching means are disposed in their latching positions to secure them against said bumper means for firmly holding said bed in place; and
   said latching means includes a pair of hooklike members pivotally mounted on said frame means for engaging the upper surfaces of said beds, each one of said hooklike members having said camming means mounted thereon in the form of an upper inclined camming surface, each one of said hooklike members further including an outwardly extending leg, an elongated locking bar adapted to be positioned adjacent said leg to prevent releasably said hooklike member from moving out of engagement with its bed.

5. A trailer according to claim 4, wherein said latching means includes return spring means for biasing the hooklike members into latching engagement with their beds, said bumper means being a plurality of resilient bumpers.

6. A trailer according to claim 4, wherein said bumper means comprises a plurality of bullet-shaped resilient members each having a stem at the bottom thereof.

7. A trailer adapted to carry a pair of first and second vehicles, comprising:
   frame means;
   a plurality of wheels rotatably mounted on said frame means to support it rollably above the ground;
   a pair of elongated vehicle supporting trailer beds having their weights distributed substantially uniformly throughout their lengths and normally disposed in a use position in side-by-side relationship in a common horizontal plane on said frame means for each supporting individually from below one of said vehicles;
   pivoting means disposed at the rear edge of said frame means for mounting individually and tiltably said beds on said frame means to enable them to tilt individually and independently until their rear edges contact the ground and to enable the loaded beds to tilt forwardly to their horizontal use position under the weight of the vehicles;
   latching means for holding said beds releasably in their use position;

bumper means disposed on said frame means under said beds when they are disposed in their horizontal use position at the forward edges of said beds for cushioning the movement of the beds into their horizontal use position under the weight of the vehicles and for urging said beds resiliently against said latching means to retard vibrations;

said pivoting means including sleeve means extending transversely under both of said beds and being fixed to one of said frame means and said beds, a pivot pin disposed axially within said sleeve means and fixed to the other one of said frame means and said sleeve means, and fastening means removably attached to said pivot pin;

elongated locking means adapted to be positioned in engagement with the latching means to prevent said latching means from moving out of engagement with said beds; and pin means adapted to extend through aligned holes in said latching means and said elongated locking means to secure releasably said latching means in engagement with said beds.

* * * * *